United States Patent Office 3,240,773
Patented Mar. 15, 1966

3,240,773
POLYMERIZATION OF ALPHA-MONOOLEFINS IN THE PRESENCE OF TITANIUM TRICHLORIDE, ORGANOMETALLIC REDUCING AGENT COMPRISING ZINC DIHYDROCARBYL, AND AN ORGANIC AMINE
John Boor, Jr., El Cerrito, Calif., assignor to Shell Oil Company, New York, N.Y., a corporation of Delaware
No Drawing. Filed July 22, 1964, Ser. No. 384,529
17 Claims. (Cl. 260—93.7)

This application is a continuation-in-part of copending application Serial No. 833,949 filed August 17, 1959, and now Patent No. 3,155,626.

This invention relates to the polymerization of unsaturated hydrocarbons. More particularly, it relates to improvements in catalysts for the low pressure polymerization of alpha-monoolefins and their use to obtain polymers of high crystallinity and controlled molecular weight.

It is known that alpha-monoolefins can be polymerized at low temperatures and low pressures to produce polymers which are linear in structure. The methods for carrying out such polymerizations are generically referred to as "low pressure" methods and the polymers thus produced are termed "low pressure" polyolefins. They are generally "linear," "isotactic" and "crystalline." Low pressure polymers are produced by employing any of a variety of catalysts which are called "low pressure" or "Ziegler type" catalysts. The use of catalysts of this type for the polymerization of diolefins has also been suggested.

A particularly useful linear polymer of the low pressure type is propylene. Isotactic polypropylene is highly useful because it has improved physical properties such as higher tensile strength, higher melting point and the like as compared to amorphous polypropylene.

The measurement generally employed as an indication of molecular weight of these polymers is the "intrinsic viscosity" (IV) expressed in deciliters per gram (dl./g.). The intrinsic viscosity of polypropylene produced by known catalyst systems is usually in the range of 4 to 20 dl./g. determined in decalin at 150° C. For many uses, e.g., for the production of molded products of polypropylene, it is desirable to have IV values in the range of 2 to 4 dl./g.

The degree of isotacticity of polymers is indicated by the percentage of polymer insoluble in a hydrocarbon solvent under standard conditions, e.g., in boiling heptane. In the production of polypropylene with known catalyst systems the "percent insolubles" values may be as low as 40 or 50% or as high as 98 or 99%. In general, the polymers of alpha-monoolefins have better overall properties when the crystallinity is high. High crystallinity is found in high isotactic polymers. In the production of polypropylene, for example, a crystallinity equivalent to 90 to 95% or more insoluble in heptane is desired. Only a few of the suggested low pressure catalyst systems produce polyolefins having the desired high degree of crystallinity.

It has been found that systems that produce a highly linear polymer generally cause the molecular weight of the polymer to be too high for efficient molding, as indicated by an excessively high intrinsic viscosity. Attempts have been made to produce polymers of lower intrinsic viscosity by the use of various additives together with the catalyst. This has met with only partial success because the use of many additives, while resulting in a polymer of lower intrinsic viscosity, at the same time reduces the crystallinity of the resulting polymer. Also, such other physical properties as tensile strength, melt index, yield point, stress and the like may be adversely affected.

The present invention is concerned with an improvement in the low pressure polymerization of alpha-monoolefins which permits the production of polyolefins of desirably low intrinsic viscosity without a concomitant loss of degree of crystallinity or other desirable properties.

It is an object of this invention to provide improved low pressure polymerization catalysts. Another object is to provide an improved method for the polymerization of alpha-monoolefins. A further object is to provide a method for catalyzing the polymerization of alpha-monoolefins of three or more carbon atoms per molecule whereby polymer of controlled molecular weight can be obtained without decreasing the crystallinity of the resulting polymer as molecular weight is decreased. Other objects will become apparent as the description of the invention proceeds.

These and other objects are accomplished in the process for the polymerization of ethylenically unsaturated compounds with a stereospecific low pressure polymerization catalyst of the Ziegler type, such as a catalyst formed by mixing an organometallic reducing agent with a compound selected from the group consisting of compounds of transition metals selected from Groups IVa, Va, VIa and VIII of the Mendeleev Periodic Table and manganese, by the improvement comprising conducting the polymerization in the presence of a zinc dihydrocarbyl which is present as said reducing agent or as an adjunct of said reducing agent, together with a controlled amount of an amine selected from certain groups defined in further detail below.

Zinc dihydrocarbyls are known compounds. They are described, for example, in "The Chemistry of Organometallic Compounds" by E. G. Rochow et al., John Wiley and Sons, 1957, pages 100–105; Table 5 of the reference, at page 102, lists physical characteristics of zinc alkyls and zinc aryls.

Reactants, catalysts and conditions useful in the process of this invention are known in the prior art on the production of linear polymers of alpha-monoolefins. They are described, for example, in Belgian Patents Nos. 534,792 and 538,782 to Ziegler and Ziegler et al., respectively. In general, low pressure catalysts are said to include the reaction product of a compound of a Group IV to VI or VIII transition metal and a strong reducing agent.

The catalysts for use in this invention comprise the reaction product of (1) a compound, preferably a halide, and more preferably a halide in a reduced valence state, of a transition metal selected from the metals in subgroups "a" of Groups IV and V of the Mendeleev Periodic Table (as illustrated on page 28 of Ephraim, "Inorganic Chemistry," Sixth English Edition) with (2) an organometallic reducing compound which may be, for example, aluminum trialkyl or zinc alkyl or a compound of the formula $R_1R_2AlX$ wherein $R_1$ and $R_2$ are hydrocarbon groups and X is halogen.

Particularly preferred catalysts are those selected from the reaction product of a trihalide of a Group IVa metal such as zirconium trichloride, titanium trichloride and the like and an aluminum dialkyl halide or aluminum trialkyl or mixtures thereof. Representative aluminum alkyls include, for example, aluminum diethyl chloride, aluminum diethyl bromide, aluminum diisopropyl chloride, aluminum triethyl, aluminum triisobutyl, aluminum triisopropyl and others wherein the alkyl radicals have from 1 to 10 carbon atoms.

Although many catalyst compositions have been suggested and may be employed to produce low pressure polymer, in practice it is found that many of these compositions produce only small amounts of polymer under practical conditions or produce polymers which are undesirable for most purposes by reason of having, for example excessively high molecular weight or excessive amounts of very low molecular weight material or having an undesirably low degree of crystallinity and the like. Only few catalysts systems actually are adapted to produce on a commercial scale polymers having the required degree of stereospecificity, IV, melt index, yield point and other properties.

It has been found that when zinc dihydrocarbyl compounds are used as adjuncts of aluminum alkyl compounds in low pressure polymerization with the above-mentioned catalysts the intrinsic viscosity of the resulting product can be substantially reduced, down to a desirable range. It has also been found that when zinc dihydrocarbyl is used as the sole reducing agent together with a transition metal of the above-described type the resulting polymer has a desirably low intrinsic viscosity. However, the use of zinc dihydrocarbyl in the polymerization of alpha olefins of three or more carbon atoms per molecule generally reduces intrinsic viscosity at the cost of some loss in crystallinity of the resulting polymer.

It has now been found that the loss of crystallinity resulting from use of zinc dihydrocarbyls in low pressure catalyst systems can be substantially prevented by employing with the zinc dihydrocarbyl a controlled amount of certain amines. The suitable amines will be further described below. It has been found that not all amines are effective when used together with zinc dihydrocarbyl and, in fact, some result in completely deactivating the effective catalyst when used in the concentrations which are desirable for effective amines. It is of particular interest in this connection that unsubstituted N-heterocyclic amines, which have been found useful with certain low pressure polymerization catalysts, are ineffective and particularly undesirable in conjunction with zinc dihydrocarbyls.

It may be possible to explain theoretically the fact that some amines are more effective than others when used in conjunction with zinc dialkyls. The invention will, however, be described by enumerating those alkyl amines which have been found and are believed to be effective for use in the present invention and will be further illustrated by showing those which have been found to be ineffective and undesirable and are to be avoided.

The suitable amines consist of the following groups: (1) aliphatic tertiary amines having at least 5 carbon atoms per molecule and preferably having from 5 to 20 carbon atoms per molecule; (2) aliphatic secondary amines having at least 5 carbon atoms per molecule and preferably having from 5 to 20 carbon atoms per molecule; (3) aliphatic primary amines having at least 4 carbon atoms per molecule and preferably having from 4 to 20 carbon atoms per molecule; and (4) heterocyclic nitrogent compounds having five- or six-membered rings and having an alkyl radical substituent on one or both carbon atoms alpha to a nitrogen atom in the ring, the alkyl radicals having a total of up to 6 carbon atoms each.

Among the secondary and tertiary aliphatic amines, all alkyl groups are usually identical but those secondary amines having two different alkyl groups and those tertiary amines having two or three different alkyl groups present are equally suitable. The alkyl groups may be branched or unbranched.

Among the heterocyclic nitrogen compounds the essential configuration is a five- or six-memebred ring containing at least one nitrogen atom and having an alkyl substitutent group alpha to the nitrogen atom. Typical are, for example, alpha-alkyl-pyrrole, alpha-alkyl-pyridine, alpha-alkyl-pyrazine, alkyl - sym - triazine, alpha-alkyl-quinoline, alpha - alkyl - isoquinoline, alpha-alkyl-naphthyridine as well as alpha-alpha' substituted compounds such as alpha-alpha'-dialkyl pyridine, pyrazine, isoquinoline or the like. The alkyl groups may have from 1 to 6 carbon atoms each. Methyl and ethyl substitutents are particularly suitable.

Although it has been generally recognized in the art that zinc alkyls should be suitable as reducing agents for use with compounds of transisition metals of Groups IV to VI, it is only in a few rare instances that working examples of the use of zinc alkyls are shown in any of the patents and literature articles dealing with this subject, as contrasted with hundreds of examples showing the use of aluminum alkyls. Such examples as exist generally deal with the production of polyethylene, which does not present the problems encountered in the production of isotactic polypropylene or higher isotactic polyolefins.

It has been found that polymerization methods utilizing catalysts in which zinc dihydrocarbyl is the sole reducing agent are extremely sensitive to trace impurities present in the zinc dihydrocarbyl and that very erratic results may be produced unless a zinc dihydrocarbyl of very high purity is employed. A suitable technique for producing such pure zinc dihydrocarbyl consists essentially of contacting technical grade zinc dihydrocarbyl with a strong reducing metal and recovering the purified dialkyl. Preferably the purification consists of refluxing over sodium metal or barium metal or similar alkali or alkaline earth metal and subsequently distilling off the purified zinc dihydrocarbyl. Although zinc dihydrocarbyl may be employed without such elaborate pretreatment and result in satisfactory polymerization when used in small concentrations as an adjunct of an aluminum alkyl reducing agent, it is preferable to employ in the process of this invention highly purified zinc dihydrocarbyl.

Suitable zinc compounds for use in this invention are those having from 1 to 10 carbon atoms in each hydrocarbyl group. Usually the two hydrocarbyl groups are identical but they may be different, if desired. Zinc diethyl and zinc di-n-propyl are particularly preferred compounds. Other zinc dihydrocarbyls which can be used in this invention are zinc diisopropyl, zinc diisobutyl, zinc diisoamyl, zinc diphenyl, zinc ditolyl and the like.

The transition metal compounds which are most particularly adapted for use with a strong reducing agent including at least some zinc dihydrocarbyl, in accordance with this invention, are various forms of titanium trichloride. One form is the commercially available trichloride, which is usually a compound of purple color. In another suitable form, a titanium trichloride may be prepared, for example, by reacting a hydrocarbon solution of aluminum triethyl and titanium tetrachloride in a mole ratio ranging from about 0.1:1 to less than 0.4:1 at elevated temperatures until the aluminum triethyl is completely oxidized and thereafter reacting the total product of the first step with a hydrocarbon solution of a suitable aluminum alkyl compound, e.g., aluminum diethyl chloride or aliuminum triethyl to give a total aluminum to titanium mol ratio of at least 1:1. The resulting product is a suspension of a catalyst, usually of brown, black or purple color, in a hydrocarbon solution. If desired, the solid catalyst may be recovered and purified by decanting or filtration and evaporation of remaining liquid constituents. The catalyst is combined with an organometallic reducing agent which may consist of zinc diethyl or of an aluminum alkyl containing some zinc diethyl, as has been described above. When the presence of some aluminum alkyl is permissible, the titanium compound need not be recovered as a solid but may be used in the original suspension. The preparation of a particularly preferred titanium trichloride catalyst in which titanium tetrachloride is first reacted with the above-defined amount of aluminum triethyl and subsequently with the above-defined amount of aluminum diethyl chloride is described in greater detail in U.S. Patent 2,971,925 to Winkler et al. The preferred form of titanium trichloride is often referred to as gamma titanium trichloride.

In a preferred mode of carrying out the present invention a catalyst solution is prepared as in said Winkler et al. patent and to that solution is added an amount in the range from 0.001 to 0.5 mol of zinc dihyrocarbyl per mol aluminum alkyl and an amount in the range from from 0.001 to 2.0 mol of a suitable amine per mol of zinc hydrocarbyl.

In the process and catalyst according to this invention the ratio of metal-organic compound to $TiCl_3$ in the effective catalyst is generally in the range from 1:1 to 10:1 and preferably in the range from 2:1 to 6:1. Higher ratios, e.g., up to 30:1, may be employed but are generally of no advantage. The amount of an effective amine of the enumerated group added to the catalyst is in the range from 0.001 to 2.0 mol of amine per mol of zinc dihydrocarbyl. Although very small amounts of amine, e.g., 0.001 mol per mol of zinc dihydrocarbyl cause some improvement in the effectiveness of the catalyst it is much preferred to employ amounts of amine in the range from 0.5 to 1.0 mol based on zinc dihydrocarbyl. In general, lower proportions of zinc dihydrocarbyl and of amine are required in large scale runs to obtain a desired intrinsic viscosity than in small scale runs.

The low pressure polymerizations of alpha-monoolefins, e.g., of ethylene, propylene, butene-1, mixtures thereof and the like are carried out at temperatures ranging from 0° C. to about 120° C. with temperatures in the order of about 20° C. to 80° C. being particularly useful. Suitable pressures range from about atmospheric pressure up to several atmospheres, with pressures in excess of 500 p.s.i. rarely being employed. The catalysts may be simply prepared by mixing the various components to form the active catalysts. Preferably the catalyst components are mixed as solutions in inert diluents such as heptane, isooctane, benzene or the like and the process itself is also preferably conducted in the presence of such inert diluents. The diluents as well as the catalyst components and reactants are preferably pre-treated to remove harmful impurities such as sulfur, oxygen, moisture, oxygen-containing compounds and the like and the polymerization is preferably conducted under conditions that exclude atmospheric impurities such as moisture, oxygen and the like. After the polymerization is complete the polymer is recovered by any of several conventional means, the most common of which includes destroying the catalyst with a compound that reacts with and inactivates the catalyst. Such compounds include, for example, low alcohols such as methanol, ketones such as acetone and the like. Thereafter, the polymer is separated from the diluent and is washed a few times and dried. The polymer produced by the present invention may be treated by any conventional means to remove or reduce the catalyst residues which remain in the polymer at the termination of the polymerization.

The invention described herein is particularly important as it relates to the low pressure polymerization of propylene and higher alpha-monoolefins to produce polymers of high stereospecificity. In general, straight chain and branched aliphatic terminally unsaturated olefins having from 3 to 20 carbon atoms per molecule and preferably from 3 to 12 carbon atoms per molecule are the most suitable feeds. This includes 1-butene, 1-pentene, 3-methyl-1-pentene 1-decene and the like. The present improvements may, however, also be utilized in the polymerization of ethylene or mixtures of ethylene and propylene and other ethylenically unsaturated compounds as well as those diolefins which can be polymerized by low pressure catalysts. The numerous teachings of the prior art with respect to Ziegler type polymerization techniques, proportions of catalytic components and the like are applicable in the process of this invention.

The following will be further illustrated by means of the following examples which, however, are only for the purpose of further explanation and are not to be considered a limitation of the invention. In these examples the crystallinity of the polypropylene produced was determined by measuring the percent of the product which was insoluble in boiling heptane. The higher this value, the more crystalline the polymer.

*Example 1*

This example illustrates a typical procedure for the polymerization of propylene by a conventional low pressure process wherein an additive of the type of the present invention is not employed.

Fifty ml. of purified heptane is placed into the body of a 100 ml. agitated autoclave previously flushed with purified nitrogen. Nitrogen is bubbled through the heptane and metal alkyl is added to the solvent with a syringe. A weighed sample of $TiCl_3$, previously purified by evacuation at 250° C., is added to the solvent from a vial. The upper section of the autoclave is flushed with nitrogen and the two autoclave parts are joined while nitrogen is passed into both. The autoclave is pressured and flushed with nitrogen five times at 200 p.s.i.g. The autoclave is then heated to the temperature of polymerization (70° C.) and purified propylene is added as a gas with agitation. The pressure is maintained at 120 to 160 p.s.i.g.

In this instance the metal alkyl added is 0.34 gram of zinc diethyl and the amount of titanium trichloride added is 0.15 gram.

At the termination of the polymerization the temperature is lowered to about room temperature and solid polypropylene is recovered by deactivating the catalyst, recovering the polymer and washing it. There is obtained a total of 28.9 grams of polypropylene, 77% of which is insoluble in boiling heptane.

*Example 2*

The procedure of Example 1 is repeated in every respect except that 0.1 millimole of monoethyl amine

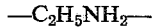
—$C_2H_5NH_2$— is added to the reactor after the catalyst components are charged. In this case there is recovered a total of 0.3 gram of polymer. This is too little to permit significant evaluation of its crystallinity. It is shown here that monoethylamine in the concentration used herein effectively kills the catalyst.

*Example 3*

The procedure of Example 1 is repeated in all respects except that in this case 0.1 millimole of diethyl amine —$(C_2H_5)_2NH$— is added. In this case there is recovered 2.6 grams of polypropylene of which 87% is insoluble in heptane. It is thus shown by comparison with Example 1 that diethyl amine substantially reduces the yield of polypropylene.

*Example 4*

The procedure of Example 1 is repeated in every respect except that 0.1 millimole of triethylamine

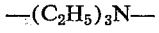
—$(C_2H_5)_3N$— is added to the reactor after the catalyst components are charged. In this case there is recovered a total of 30 grams of polymer, 92% of which is insoluble in boiling heptane. It is thus shown that triethylamine is extremely effective in improving the crystallinity of polypropylene while at the same time even increasing the yield of the polymer.

Example 5

The procedure of Example 1 is repeated in a series of individual runs in which in each case a different trialkyl amine is added to the reactor in the amount of 0.1 millimole after the catalyst components are charged. The amines added are, respectively, trimethyl amine, triethyl amine, tripropyl amine and tributyl amine. Of this series the triethyl amine is by far the most effective, resulting in a yield of 30 grams of polypropylene having 92% insoluble in boiling heptane, as also shown in Example 4. Next most effective is tripropyl amine, which results in the same crystallinity but only a 20 gram yield. Next is tributyl amine, which results in 20 gram yield of 84% insoluble. Trimethyl amine is essentially ineffective, resulting in a yield of 7 grams of polypropylene having only 79% insoluble in heptane, i.e., about as low a crystallinity as in the absence of amine.

Example 6

The procedure of Example 1 is repeated in four separate runs in which in each case a dialkyl amine is added to the reactor in the amount of 0.1 millimole after the catalyst components are charged. The amines added are, respectively, dimethyl amine, diethyl amine, dibutyl amine and diheptyl amine. The most effective in this group is dibutyl amine, which results in a yield of 18.5 grams of polypropylene having a crystallinity of 92% insoluble in heptane. Diheptyl amine results in a 10.1 gram yield with 90% insoluble in heptane. Diethyl amine and dimethyl amine result in yields of only 2.7 and 1.1 grams, respectively, having percent insolubles of 87 and 88, respectively, and are thus not very effective in improving crystallinity while adversely affecting yield.

Example 7

The procedure of Example 1 is repeated except that in several individual runs different monoalkyl amines are added to the reactor in the amount of 0.1 millimole after catalyst components are charged. The amines are monoethyl amine, monobutyl amine and a branched primary amine of a $C_{12}$–$C_{15}$ alkane. The last named amine results in a yield of 12.5 grams of polypropylene having 89% insoluble in heptane with n-butyl amine results in a yield of 26.9 grams having 84% insoluble. Monoethyl amine affects the yield adversely, as shown in Example 2 above.

Example 8

The procedure of Example 1 is repeated in a series of three experiments in which in each instance an unsubstituted nitrocyclic compound having one nitrogen atom per ring is added to the extent of 0.1 millimole after the catalyst components are charged. The several compounds added were piperidine,

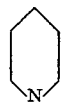

pyridine,

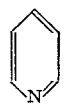

and α,α'-dipyridyl,

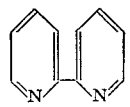

In each event the yield of polypropylene is nil.

Example 9

The procedure of Example 1 is repeated in a series of experiments in which in each event 0.1 millimole of an alkyl substituted nitrocyclic compound is added to the reactor after the catalyst components are charged. The compounds added are, respectively, α-picoline,

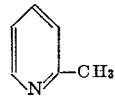

β-picoline,

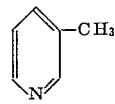

α-ethyl pyridine,

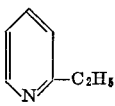

and 2,6-lutidine,

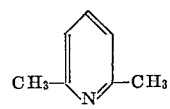

The yields and crystallinites are as follows: α-picoline results in a yield of 14.9 grams of polypropylene having 93% insoluble in heptane; β-picoline results in 0 yield of polypropylene; α-ethyl pyridine results in 8.3 gram yield of polypropylene having 88% insoluble in heptane; 2,6-lutidine results in 14.7 gram yield of polypropylene having 94% insoluble in heptane.

It is thus shown that nitrocyclic compound having one or two methyl groups alpha to the nitrogen atom is a highly effective amine resulting in good yield of polypropylene of high crystallinity. An ethyl group alpha to the nitrogen results in a somewhat lower yield of somewhat lower crystallinity. Placing the alkyl group in a beta position completely destroys the effectiveness of the amine.

Example 10

In several larger scale runs, 8 liters of isooctane, 100 to 160 millimoles of $AlEt_2Cl$, 28 millimoles of $TiCl_3$, 5 to 10 millimoles of zinc diethyl and 5 to 10 millimoles of triethylamine were contacted with propylene at 40 p.s.i.g. In 3 hour runs, 300 to 363 g. of polypropylene containing over 93% insolubles and with IV values between 2.7 and 3.2 were obtained.

Example 11

The procedure of Example 1 is repeated with the following differences.

The $TiCl_3$ is added in the form of a slurry of brown $TiCl_3$, prepared by heating aluminum triethyl and titanium tetrachloride in a molar ratio of 1:3 in a hydrocarbon diluent at 80° C. for 3.5 hours, adding sufficient aluminum diethyl chloride to bring the Al:Ti ratio to about 4:1 and heating for one more hour at 80° C. Sufficient slurry is added to provide 1 millimole of $TiCl_3$. The metal alkyl co-catalyst consists of 4 millimole of aluminum diethyl chloride, together with specified amounts of zinc diethyl.

The results of several runs are presented in Table 1.

TABLE 1

| Run No. | Additive, mmole | | Results | | |
|---|---|---|---|---|---|
| | ZnEt₂ | Et₃N | Yield, g. | Percent Insoluble | I.V. |
| 11-1 | 0.5 | None | 13.8 | 87 | 4.4 |
| 11-2 | 0.5 | 0.1 | 20.5 | 89.7 | 4.1 |
| 11-3 | 0.5 | 0.2 | 15.4 | 92.5 | 3.8 |
| 11-4 | 5.1 | 7.5 | 36.3 | 95.0 | 3.2 |

*Example 12*

When other zinc dihydrocarbyls, e.g., zinc dimethyl, zinc diisopropyl, or zinc diphenyl, are substituted for zinc diethyl in a repetition of the above examples, substantially similar trends of conversion and crystallinity are observed.

*Example 13*

When it is desired to use other transition metal compounds, e.g., titanium trichloride, vanadium trichloride or zirconium trichloride, the procedures of Examples 10 and 11 can be employed and similar results obtained. Other aluminum compounds such as the dialkyl halides or trialkyls mentioned above may be substituted for aluminum diethyl chloride in these examples.

From the foregoing examples and description it will be seen that the present invention is capable of numerous modifications, not only in regard to the specific method of preparing and using the catalyst, but also in regard to the amount of the additives that may be employed. Other modifications such as various polymerization temperatures and pressures, heating cycles, polymer workup and the like may be adopted, but such modifications do not form an essential part of the present invention and may be employed without departing from the spirit thereof.

Although zinc dialkyls are usually added as such, they may also be formed in situ by adding a suitable zinc compound, e.g., zinc fluoride or stearate, which interacts with aluminum alkyl to form zinc alkyl and an aluminum salt.

I claim as my invention:

1. In the process for polymerizing an alpha monoolefin of from 3 to 12 carbon atoms per molecule to a solid polymer by contact with catalyst comprising titanium trichloride and an organometallic reducing agent, the improvement which comprises contacting said olefin with a catalyst composition comprising
    (a) titanium trichloride,
    (b) a zinc dihydrocarbyl having from 1 to 10 carbon atoms in each hydrocarbyl group, and
    (c) from 0.001 mol to 2 mol per mole of zinc dihydrocarbyl of an organic amine selected from the group consisting of heterocyclic nitrogen compounds having five- to six-membered rings and having an alkyl radical substituent of up to 6 carbon atoms on at least one carbon alpha to a nitrogen atom in the ring.

2. A process according to claim 1 in which said alpha-monoolefin is propylene.

3. A process according to claim 1 in which said zinc dihydrocarbyl is zinc diethyl.

4. A process according to claim 1 in which said titanium trichloride is gamma titanium trichloride.

5. A process according to claim 11 wherein said amine is aliphatic tertiary amine having at least 5 carbon atoms per molecule.

6. A process according to claim 11 in which said amine is triethylamine.

7. A process according to claim 11 in which said amine is triisopropylamine.

8. A process according to claim 11 in which said amine is di-n-butylamine.

9. A process according to claim 1 in which said amine is α-picoline.

10. A process according to claim 1 in which said amine is 2,6-lutidine.

11. In the process for polymerizing an alpha monoolefin of from 3 to 12 carbon atoms per molecule to a solid polymer by contact with catalyst comprising titanium trichloride and an organometallic reducing agent, the improvement which comprises contacting said olefin with a catalyst composition comprising
    (a) titanium trichloride,
    (b) an aluminum alkyl selected from the group consisting of aluminum trialkyls and aluminum dialkyl chlorides,
    (c) a zinc dialkyl having from 1 to 10 carbon atoms in each alkyl group, and
    (d) an organic amine selected from the groups consisting of (1) aliphatic tertiary amines having at least 5 carbon atoms per molecule, (2) aliphatic secondary amines having at least 5 carbon atoms per molecule, (3) aliphatic primary amines having at least 4 carbon atoms per molecule, and (4) heterocyclic nitrogen compounds having five- to six-membered rings and having an alkyl radical substituent of up to 6 carbon atoms on at least one carbon alpha to a nitrogen atom in the ring, wherein the molar ratio of combined metal alkyls to titanium trichloride is in the range from 1:1 to 10:1, the molar ratio of zinc diethyl to aluminum diethyl chloride is in the range from 0.001:1 to 0.5:1, and the molar ratio of amine to zinc diethyl is in the range from 0.001:1 to 2.0:1.

12. A process according to claim 11 in which said alpha monoolefin is propylene.

13. In the polymerization of propylene to a solid polymer by contact with a catalyst comprising titanium trichloride and an organometallic reducing agent, the improvement which comprises contacting propylene with a catalyst composition consisting of the reaction product of
    (a) titanium trichloride,
    (b) aluminum diethyl chloride,
    (c) zinc diethyl, and
    (d) an organic amine selected from the group consisting of (1) aliphatic tertiary amines having at least 5 carbon atoms per molecule, (2) aliphatic secondary amines having at least 5 carbon atoms per molecule, (3) aliphatic primary amines having at least 4 carbon atoms per molecule, and (4) heterocyclic nitrogen compounds having five- to six-membered rings and having an alkyl radical substituent of up to 6 carbon atoms on at least one carbon alpha to a nitrogen atom in the ring, wherein the molar ratio of combined metal alkyls to titanium trichloride is in the range from 1:1 to 10:1, the molar ratio of zinc diethyl to aluminum diethyl chloride is in the range from 0.001:1 to 0.5:1, and the molar ratio of amine to zinc diethyl is in the range from 0.001:1 to 2.0:1.

14. A process according to claim 13 wherein said amine is aliphatic tertiary amine having at least 5 carbon atoms per molecule.

15. A process according to claim 13 wherein said amine is triethylamine.

16. A process according to claim 13 wherein said amine is triisopropyl amine.

17. In the polymerization of propylene to a solid polymer by contact with a catalyst comprising titanium trichloride and an organometallic reducing agent, the improvement which comprises contacting propylene with a catalyst composition consisting of the reaction product of
    (a) titanium trichloride,
    (b) aluminum diethyl chloride,
    (c) zinc diethyl, and
    (d) an organic amine selected from the group consisting of heterocyclic nitrogen compounds having fiveto six-membered rings and having an alkyl radical substituent of up to 6 carbon atoms on at least one carbon alpha to a nitrogen atom in the ring, wherein the molar ratio of combined metal alkyls to titanium trichloride is in the range from 1:1 to 10:1, the molar ratio of zinc diethyl to aluminum diethyl chloride is in the range from 0.001:1 to 0.5:1, and the molar ratio of amine to zinc diethyl is in the range from 0.001:1 to 2.0:1.

References Cited by the Examiner

UNITED STATES PATENTS

| | | | |
|---|---|---|---|
| 2,905,645 | 9/1959 | Anderson et al. | 260—94.9 |
| 2,971,925 | 2/1961 | Winkler et al. | 260—93.7 |
| 3,027,360 | 3/1962 | Raum | 260—93.7 |
| 3,050,471 | 8/1962 | Anderson et al. | 260—94.9 |
| 3,058,963 | 10/1962 | Vandenberg | 260—93.7 |
| 3,070,549 | 12/1962 | Ziegler et al. | 260—94.9 |
| 3,139,418 | 6/1964 | Marullo et al. | 260—93.7 |

FOREIGN PATENTS

| | | |
|---|---|---|
| 554,242 | 2/1957 | Belgium. |
| 559,727 | 1/1958 | Belgium. |

JOSEPH L. SCHOFER, *Primary Examiner.*

M. B. KURTZMAN, *Assistant Examiner.*